United States Patent
Saxena et al.

(10) Patent No.: US 9,245,118 B2
(45) Date of Patent: Jan. 26, 2016

(54) METHODS FOR IDENTIFYING KEY LOGGING ACTIVITIES WITH A PORTABLE DEVICE AND DEVICES THEREOF

(71) Applicant: Infosys Limited, Bangalore (IN)

(72) Inventors: Ashutosh Saxena, Hyderabad (IN); Harigopal K. B. Ponnapalli, Hyderabad (IN); Anand S. Nair, Trivandrum (IN)

(73) Assignee: Infosys Limited, Bangalore (IN)

( * ) Notice: Subject to any disclaimer, the term of this patent is extended or adjusted under 35 U.S.C. 154(b) by 273 days.

(21) Appl. No.: 13/943,936

(22) Filed: Jul. 17, 2013

(65) Prior Publication Data

US 2014/0026217 A1 Jan. 23, 2014

(30) Foreign Application Priority Data

Jul. 18, 2012 (IN) .......................... 2948/CHE/2012

(51) Int. Cl.
*G06F 21/55* (2013.01)

(52) U.S. Cl.
CPC ........ *G06F 21/554* (2013.01); *G06F 2221/031* (2013.01)

(58) Field of Classification Search
CPC .................................................... G06F 21/554
USPC .......................................................... 726/23
See application file for complete search history.

(56) References Cited

U.S. PATENT DOCUMENTS

| | | | |
|---|---|---|---|
| 7,721,333 B2 | 5/2010 | Horne | |
| 7,979,368 B2 | 7/2011 | Kapoor et al. | |
| 2006/0101128 A1* | 5/2006 | Waterson | 709/212 |
| 2006/0206937 A1 | 9/2006 | Repasi et al. | |
| 2007/0169191 A1 | 7/2007 | Greene et al. | |
| 2007/0180520 A1 | 8/2007 | Horne | |
| 2007/0240212 A1 | 10/2007 | Matalytski | |
| 2008/0134314 A1 | 6/2008 | Hamid | |
| 2008/0189790 A1 | 8/2008 | Park | |
| 2009/0144558 A1 | 6/2009 | Wang | |
| 2009/0271866 A1 | 10/2009 | Liske | |
| 2009/0319782 A1 | 12/2009 | Lee | |
| 2010/0058479 A1 | 3/2010 | Chen et al. | |
| 2011/0265156 A1* | 10/2011 | Bombay | 726/5 |

OTHER PUBLICATIONS

Le et al., "Detecting Kernal Level Keyloggers Through Dynamic Taint Analysis", College of William & Mary Department of Computer Science Technical Report, WM-CS-2008-05 (2008).

(Continued)

*Primary Examiner* — Jacob Lipman
(74) *Attorney, Agent, or Firm* — LeClairRyan, a Professional Corporation (57) ABSTRACT

A method, non-transitory computer readable medium, and apparatus that establishes a connection with a host computing device. One or more processes running on the host computing device are identified. One or more hooking operations performed in the one or more identified processes are identified. One or more suspected key logging actions are identified from the one or more identified hooking operations based on one or more of a first set of rules and output.

27 Claims, 3 Drawing Sheets

(56) References Cited

OTHER PUBLICATIONS

Ortolani et al., "Bait Your Hook: A Novel Detection Technique for Keyloggers", In Proceedings of the 13th International Symposium on Recent Advances in Intrusion Detection (RAID 2010) Sep. 15-17, 2010, Ottawa, Canada (2010).

Microsoft, "The Security Monitoring and Attack Detection Planning Guide", Microsoft Solutions for Security and Security Center of Excellence, http://www.dabcc.com/documentlibrary/file/MicrosoftreleasesanewSecurity.MonitoringandAttackDetectionWhitepaper.pdf, retrieved on Mar. 12, 2012.

* cited by examiner

METHODS FOR IDENTIFYING KEY LOGGING ACTIVITIES WITH A PORTABLE DEVICE AND DEVICES THEREOF

This application claims the benefit of Indian Patent Application Filing No. 2948/CHE/2012, filed Jul. 19, 2012, which is hereby incorporated by reference in its entirety.

FIELD

This technology generally relates to methods and devices for identifying keyloggers and, more particularly, to methods and devices that identify and provide alerts about key logging activities through the use of a portable security computing device.

BACKGROUND

Users of digital services and utilities can be attacked in multiple ways. One well known type of attack is key logging which involves tracking or logging of keys struck on a keyboard. Computer hardware and software which accomplishes this task of key logging are called keyloggers.

Typically, keyloggers conduct key logging in a covert manner so users of the keyboard at a host computer are unaware their key stroke actions are being monitored. The keyloggers usually store the captured keystrokes in a file on the host computer which is accessed and transmitted in real time or at a later time to a hacker. Some of the more recent versions of keyloggers have become more sophisticated and only send a portion of the captured keystrokes relating to information identified as being particularly important, such as credit card or password information.

When initially installed most keyloggers will make an entry to the registry of the operating system in the host computer and are configured to always start when the operating system boots the host computer. When a user of the host computer presses a key on the keyboard, the keyboard driver receives the scan code corresponding to the key being pressed. There is a unique scan code corresponding to all the keys on the keyboard. This scan code is sent to the keyboard device driver which translates it to a virtual-key code, which is a device independent value defined by the system that identifies the purpose of the key. The keyboard driver then creates a message that includes the scan code, the virtual key and other keystroke information and then places the message in the system message queue. The message is then removed from the system message queue and is sent to the corresponding thread of the application. The thread's message loop removes the message and passes it to the appropriate window procedure of the application for processing.

The keylogger intercept the keystrokes either at the keyboard driver level by replacing the keyboard driver with a malicious keylogger driver, by adding filters between the keyboard driver and the system message queue, or by hooking the various windows API calls. Hooking happens when a keystroke message arrives in the message queue and the callback function associated with the keyloggers is called to record the keystroke. This message is then stored to a file which is transferred to the hacker's computer via e-mail, ftp or irc channel.

Various prior proposals have been made to detect and prevent keylogging activities by keyloggers. For example, one proposal involves using signature based schemes in anti-virus software to try to identify and block keyloggers. Unfortunately these schemes are ineffective against zero day and unknown keyloggers.

Other proposals to combat keyloggers involve the use of virtual keyboards. Unfortunately, even with virtual keyboards aggressive keyloggers are able to grab screenshots from the host computer on every mouse click to obtain key logging activities. Additionally, these keyloggers may use various form grabbers to grab the details entered in the form on the host computer and send these details to the hacker's computer. Form grabbing is done by exploiting the vulnerabilities in the web browser of the host computer.

Further proposals to prevent keylogging activities include encrypting keystrokes before they enters the system in the host computer system and only decrypting these keystrokes at the application level. This ensures a keylogger only captures encrypted key logging activity which cannot be decrypted without the key. Unfortunately, this technique is still ineffective against keyloggers which use form grabbers.

SUMMARY

A method for identifying one or more key logging activities includes establishing a connection between a portable security computing device and a host computing device. One or more processes running on the host computing device are identified by the portable security computing device. One or more hooking operations performed in the one or more identified processes are identified by the portable security computing device. One or more suspected key logging actions are identified by the portable security computing device from the one or more identified hooking operations based on one or more of a first set of rules. The one or more identified suspected key logging actions are output by the portable security computing device.

A non-transitory computer readable medium having stored thereon instructions for identifying one or more key logging activities comprising machine executable code which when executed by at least one processor, causes the processor to perform steps including establishing a connection with a host computing device. One or more processes running on the host computing device are identified. One or more hooking operations performed in the one or more identified processes are identified. One or more suspected key logging actions are identified from the one or more identified hooking operations based on one or more of a first set of rules and is output.

A portable security device includes a memory coupled to one or more processors which are configured to execute programmed instructions stored in the memory including establishing a connection with a host computing device. One or more processes running on the host computing device are identified. One or more hooking operations performed in the one or more identified processes are identified. One or more suspected key logging actions are identified from the one or more identified hooking operations based on one or more of a first set of rules and is output.

This technology provides a number of advantages including providing more effective methods and devices for identifying and providing alerts about key logging activities through the use of a portable computing device. This technology can be deployed in multiple portable form factors, such as with a portable dongle or in a user's mobile phone. Additionally, by using a portable form factor for this technology an end user can easily couple and utilize this key logging protection within any host computing device at any time. Further, since this technology is separately housed from the host computing device, it is less susceptible to attacks than prior systems which are loaded on the host computing device and could be blocked by the keylogger from executing their protective functionality. Further, this technology utilizes a secure mutual authentication procedure to interact with and download updates for identifying key logging activities from a key logging management server. This methodology ensures that this technology gets its updates from a trusted key logging management server and not from a malicious server. Any malicious server attempting to corrupt the portable security computing device through updates will fail authentication and thus will not be successful.

DETAILED DESCRIPTION

Figure 1:
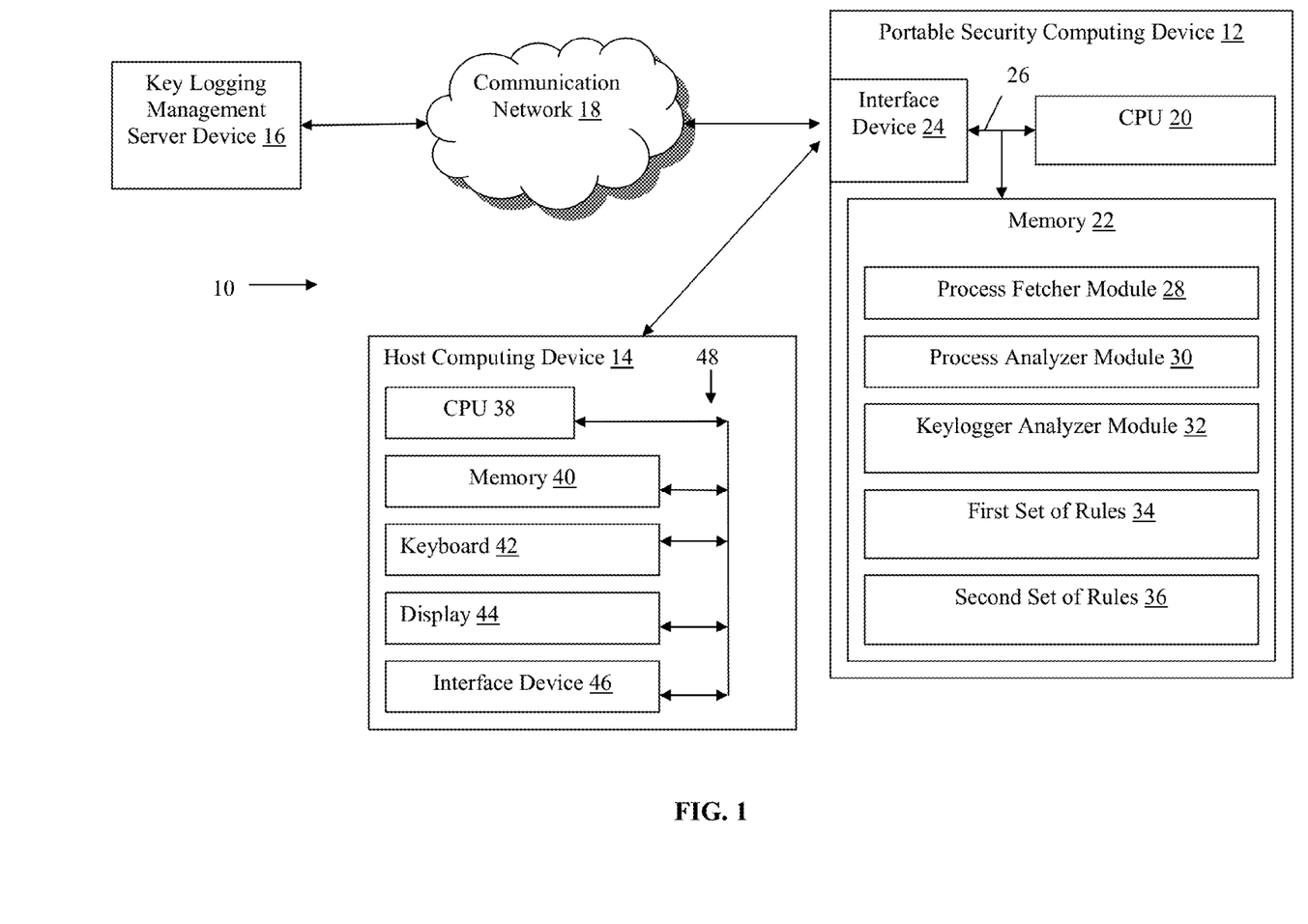
FIG. 1 is an exemplary environment with a portable security computing device that identifies and provides alerts about one or more key logging activities.

An exemplary environment 10 with a portable security computing device 12 that identifies and provides alerts about one or more key logging activities is illustrated in FIG. 1. The environment 10 includes the portable security computing device 12, a host computing device 14, and a key logging management server device 16 which are all coupled together by a communication network 18, although this environment can include other numbers and types of systems, devices, components, and elements in other configurations, such as multiple numbers of each of these apparatuses and devices which are coupled together in other manners. This technology provides a number of advantages including providing more effective methods and devices identifying and providing alerts about one or more key logging activities through the use of a portable security computing device.

By way of example only, the portable security computing device 12 manages identifying key logging activities on the host computing device 14 and obtaining secure updates from the key logging management server device 16, although other numbers and types of devices and systems could be used for the portable security computing device 12 and other numbers and types of functions could be performed. In this example, the portable security computing device 12 comprises a dongle which is a plug and play device configured to directly couple to a USB port of the host computing device 14 which provides a secure computing environment, although the portable security computing device 12 could comprise other types of devices in other form factors. For example, the portable security computing device 12 may be a mobile phone programmed to execute the exemplary instructions as illustrated and described herein and could be coupled to the host computing device 14 in other manners, such as through a wireless connection by way of example only.

The portable security computing device 12 includes a central processing unit (CPU) or processor 20, a memory 22 including process fetcher module 28, process analyzer module 30, keylogger analyzer module 32, a first set of rules 34, and a second set of rules 36, and an interface device 24 which are coupled together by a bus or other link 24, although other numbers and types of systems, devices, components, and elements in other configurations and locations can be used. The processor 20 in the portable security computing device 12 executes a program of stored instructions for one or more aspects of the present technology as described and illustrated by way of the examples herein, although other types and numbers of processing devices and logic could be used and the processor could execute other numbers and types of programmed instructions.

In this example, the memory 20 with the process fetcher module 28, the process analyzer module 30, the keylogger analyzer module 32, the first set of rules 34, and the second set of rules 36 in the portable security computing device 12 stores these programmed instructions and data for one or more aspects of the present technology as described and illustrated herein, although some or all of the programmed instructions and data could be stored and executed elsewhere and other types and amounts of instructions and data could be stored. A variety of different types of memory storage devices, such as a random access memory (RAM) or a read only memory (ROM) in the system or a floppy disk, flash memory, solid state memory, hard disk, CD ROM, DVD ROM, or other computer readable medium which is read from and written to by a magnetic, optical, or other reading and writing system that is coupled to the processor 20 in the portable security computing device 12, can be used for the memory 22 in the portable security computing device 12. As illustrated and described in greater detail herein, in this particular example the portable security computing device 12 executes the process fetcher module 28, the process analyzer module 30, and the keylogger analyzer module 32 and utilizes the first set of rules 34, and the second set of rules 36 to identify a keylogger in the host computing device 14 and to output resulting identification information including alerts, although other manners for identifying keyloggers and outputting the identification could be used. Additionally, these exemplary modules and other processes as illustrated and described herein could be executed partly or wholly by other devices and systems.

The interface device 24 in the portable security computing device 12 is used to operatively couple and communicate between the portable security computing device 12 and the host computing device 14 and the key logging management server device 16 via the communications network 18 and the USB connection in this particular example, although other types and numbers of communication networks or systems with other types and numbers of connections and configurations could be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The host computing device 14 includes a central processing unit (CPU) or processor 38, a memory 40, keyboard 42, display 44, and an interface or I/O system 46 which are coupled together by a bus or other link 48, although the host computing device could comprise other numbers and types of devices, elements, and components in other configurations. By way of example only, the host computing device 14 may be used to execute any numbers of different types of processes which may involve use of the keyboard 42 to enter keystrokes which could be subject to attack by a keylogger, although the host computing device could execute other types and numbers of operations.

The processor 38 in the host computing device 14 may execute a program of stored instructions for one or more aspects of the present technology as described and illustrated by way of the examples herein, although other types and numbers of processing devices and logic could be used and the processor could execute other numbers and types of programmed instructions. The memory 40 may store these programmed instructions and data for one or more aspects of the present technology as described and illustrated herein, although some or all of the programmed instructions and data could be stored and executed elsewhere and other types and amounts of instructions and data could be stored. A variety of different types of memory storage devices, such as a random access memory (RAM) or a read only memory (ROM) in the system or a floppy disk, flash memory, solid state memory, hard disk, CD ROM, DVD ROM, or other computer readable medium which is read from and written to by a magnetic, optical, or other reading and writing system that is coupled to the processor 38 in the host computing device 14, can be used for the memory 40 in the host computing device 14.

The keyboard 42 in the host computing device enables a user to enter in keystrokes, although other types and numbers of user input devices, such as a computer mouse, could be used. The display 44 in the host computing device is a computer screen display device used to provide a visual display of text, images and other information for a user at the host computing device to view and interact with, although other types and numbers of displays could be used.

The interface device 46 in the host computing device 14 is used to operatively couple and communicate between the host computing device 14 and the portable security computing device 12 via a USB connection in this particular example, although the interface device 46 can be used to couple the host computing device 14 to other types and numbers of devices and systems and could use other types and numbers of communication networks or systems with other types and numbers of connections and configurations. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The key logging management server device 16 includes a central processing unit (CPU) or processor, a memory, and an interface or I/O system, which are coupled together by a bus or other link, although the server computing device could comprise other numbers and types of devices, elements, and components in other configurations. In this example, the key logging management server device 16 may be used to establish a secure communication with the portable security computing device 12 to provide one or more updates relating to identifying key logging activities, such as updating one or more of the process fetcher module 28, the process analyzer module 30, the keylogger analyzer module 32, the first set of rules 34, and the second set of rules 36 by way of example only, although the key logging management server device 16 could perform other types and numbers of processes.

Although examples of the portable security computing device 12, the host computing device 14, and the key logging management server device 16 are described herein, each of these devices can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
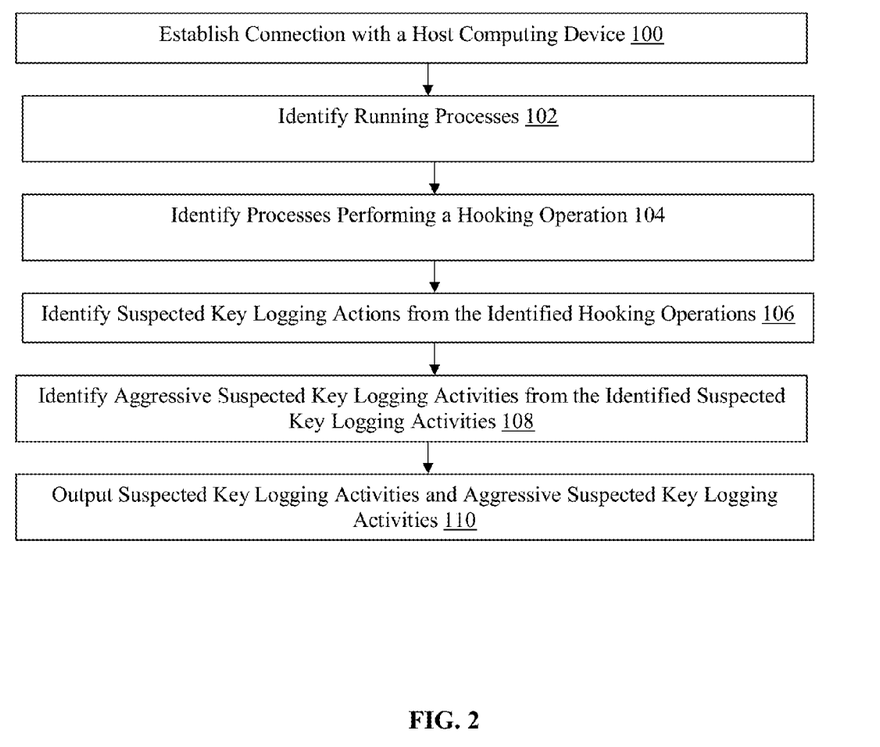
FIG. 2 is a flow chart of an exemplary method for identifying and providing alerts about one or more key logging activities with a portable security computing device.

An exemplary method for identifying key logging activities with the portable security computing device 12 will now be described with reference to FIGS. 1-2. In this particular example, the modules and sets of rules used in the examples herein are merely exemplary and other numbers and types of modules, instructions, sets of rules and other data in other configurations could be used.

In step 100, the portable security computing device 12 establishes a connection with the host computing device 14 over a USB connection, although other types and numbers of connections can be used. By way of example only, if the portable security computing device 12 is a mobile phone, the connection to the host computing device 14 could be a wireless connection, although other types and numbers of connections could be used.

In step 102, the process fetcher module 30 in the portable security computing device 12 identifies and obtains a list of one or more processes running on the host computing device 14, although other manners for identifying processes could be used. In this particular example, the process fetcher module 28 hooks to the host operating system (OS) in the host computing device 14 to identify and obtain a list of one or more processes running on the host computing device 14. The process fetcher module 28 provides the identified list of one or more running processes on the host computing device 14 to process analyzer module 30 in the portable security computing device 12.

In step 104, the process analyzer module 30 in the portable security computing device 12 identifies one or more hooking operations performed in the one or more identified processes from the process fetcher module 30. In this particular example, the process analyzer module 30 randomly generates a sequence of keystrokes and then monitors the operating system in the host computing device 14 to identify any of the one or more running processes which perform a hooking operation as a result of the generation of the sequence of keystrokes, although other manners for identifying hooking or other operations could be used. By way of example only, the process analyzer module 30 may identify hooks to function calls in one or more running processes in the host computing device 14, such as SetWindowsHookEx, GetAsyncKeyState, GetKeyboardState and GetKeyState in a Windows OS in the host computing device 14. The process analyzer module 30 provides this filter list of the one or more identified running processes that perform a hooking function to the key logger analyzer module 32 in the portable security computing device 12, although the filter list of processes performing hooking operations could be obtained and provided in other manners.

In step 106, the key logger analyzer module 32 in the portable security computing device 12 identifies any suspected key logging actions in the list of one or more identified hooking operations based on one or more of the first set of rules 34 stored in memory 22 in the portable security computing device 12, although other manners for identifying hooking operations could be used. By way of example only, the suspected key logging actions in the first set of rules 34 may include a write operation, although other types and numbers of suspected key logging actions could be in the first set of rules. As described in greater detail below with reference to FIG. 3, to reduce the rate of false positives updates for identifying key logging activities, including for the first set of rules 34 and second set of rules, are dynamically and securely obtained from the key logging management server device 16. The list of one or more suspected key logging actions identified from the one or more identified hooking operations based on one or more of a first set of rules by the key logger analyzer module 32 is provided to and stored by the process analyzer module 30, although the list could be stored in other locations. All of these processes at this stage are identified as potential keyloggers by the portable security computing device 12.

In step 108, the key logger analyzer module 32 in the portable security computing device 12 also may utilize the second set of rules 36 to identify one or more of the aggressive suspected key logging actions from the one or more identified suspected key logging actions based on one or more of the second set of rules, although other manners for identifying hooking operations could be used. By way of example only, aggressive suspected key logging actions in the second set of rules 36 may include a screenshot capture, such as from malicious form grabbers, or sending packets out over the internet, such as packets with credit card or password information, although other types and numbers of aggressive suspected key logging actions could be in the second set of rules. The list of one or more aggressive suspected key logging actions identified from the one or more identified suspected key logging actions based on one or more of the second set of rules by the key logger analyzer module 32 is provided to and stored by the process analyzer module 30, although the list could be stored in other locations.

In step 110, in this example the portable security computing device 12 outputs one or more alerts regarding the one or more identified suspected key logging actions and/or the one or more identified aggressive suspected key logging actions, although other types and amounts of information could be output. By way of example only, the output alerts might advises the operator at the host computing device 14 about those programs with the process which are listed in suspicious list and/or the aggressive suspicious list and advise the operator to kill those listed processes, although the operator could be provided with other types of alerts and advised to take other types of actions.

Figure 3:
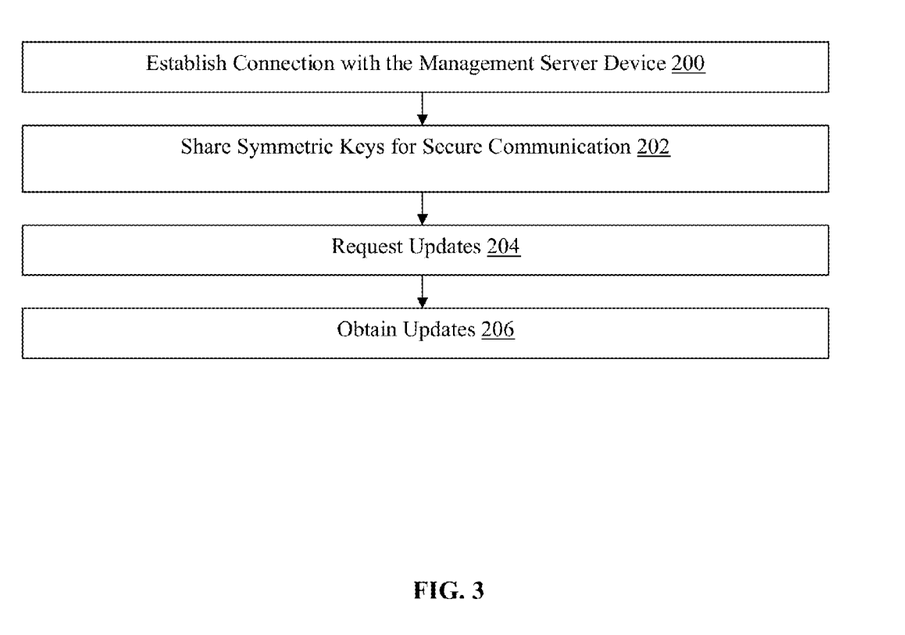
FIG. 3 is a flow chart of an exemplary method for updating the portable security computing device.

Referring to FIGS. 1 and 3, the exemplary method for securely and safely updating the portable security computing device is illustrated. In step 200, the portable security computing device 12 establishes a connection with the key logging management server device 16, although other types of connections with other types and numbers of devices or systems could be established.

In step 202, the portable security computing device 12 exchanges symmetric keys with the key logging management server device 16 to establish a secure connection for the transmission of updates to the portable security computing device 12, although other manners for establishing a secure connection could be used. In this particular example, this mutual authentication protocol enables the portable security computing device 12 and the key logging management server device 16 to satisfy themselves mutually about each other's identity to exchange the session keys.

In step 204, once the mutual authentication process is successfully completed, the portable security computing device 12 requests for any updates for identifying key logging activities from the key logging management server device 16, although other manners for obtaining other types and numbers of updates could be used. By way of example only, one or more of the process fetcher module 28, the process analyzer module 30, the keylogger analyzer module 32, the first set of rules 34, and the second set of rules 36 could be updated.

In step 206, the portable security computing device 12 securely and safely obtains any updates from the key logging management server device 16 over the secure connection, although other manners for obtaining updates could be used.

Accordingly, as illustrated and described with the example herein this technology provides providing more effective methods and devices for identifying and providing alerts about key logging activities. This technology enables a user to utilize any host computer, whether it is a computer in a computer café or any business computer, and this technology can easily connect, identify any key logging activity and alert the user. Additionally, this technology utilizes mutual authentication process with the management server before downloading any upgrades relating to the identification of key logging activities. This ensures that any downloaded upgrades are only received from the legitimate management server.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for identifying a key logging activity, the method comprising:

establishing by a portable computing device a secure connection to a management server;

obtaining at the portable computing device over the established secure connection one or more updates to a first set of rules;

establishing another separate connection between the portable computing device and a host computing device;

identifying by the portable computing device one or more processes running on the host computing device;

identifying by the portable computing device one or more hooking operations performed in the one or more identified processes;

identifying by the portable computing device one or more suspected key logging actions from the one or more identified hooking operations based on one or more of the first set of rules;

identifying by the portable computing device from the identified one or more suspected key logging actions one or more suspected aggressive key logging actions based on one or more of a second set of rules; and outputting by the portable computing device the one or more identified suspected key logging actions and the one or more identified suspected aggressive key logging actions.

2. The method as set forth in claim 1 wherein the establishing the connection further comprises establishing the connection to the host computing device over a USB connection.

3. The method as set forth in claim 1 wherein the establishing the connection further comprises establishing the connection to the host computing device over a wireless connection.

4. The method as set forth in claim 1 wherein the identifying the one or more suspected key logging actions further comprises identifying by the portable computing device a write operation from the one or more identified hooking operations based on the one or more first set of rules.

5. The method as set forth in claim 1 further comprising:
establishing by the portable computing device a secure connection to a management server; and
obtaining at the portable computing device over the established secure connection one or more updates to at least one of the one or more of the first set of rules or the one or more second set of rules.

6. The method as set forth in claim 1 wherein the identifying the one or more hooking operations performed in the one or more identified processes further comprises identifying by the portable computing device the one or more hooking operations to one or more function calls in the one or more identified processes.

7. The method as set forth in claim 6 wherein the identifying the one or more hooking operations to one or more function calls further comprises identifying by the portable security computing device at least one of: SetWindowsHookEx, GetAsyncKeyState, GetKeyboardState, or GetKeyState.

8. The method as set forth in claim 1 wherein the outputting further comprising outputting by the portable computing device one or more recommended actions for at least one of the one or more identified suspected key logging actions or the one or more identified suspected aggressive key logging actions.

9. The method as set forth in claim 8 wherein one of the one or more recommended actions comprises killing at least one of the one or more identified suspected key logging actions or the one or more identified suspected aggressive key logging actions.

10. A non-transitory computer readable medium having stored thereon instructions for identifying key logging activities comprising machine executable code which when executed by at least one processor, causes the processor to perform steps to and that comprise:
establish a secure connection to a management server;
obtain over the established secure connection one or more updates to a first set of rules;
establish another separate connection to a host computing device;
identify one or more processes running on the host computing device;
identify one or more hooking operations performed in the one or more identified processes;
identify one or more suspected key logging actions from the one or more identified hooking operations based on one or more of the first set of rules;
identify from the identified one or more suspected key logging actions one or more suspected aggressive key logging actions based on one or more of a second set of rules; and
output the one or more identified suspected key logging actions and the one or more identified suspected aggressive key logging actions.

11. The medium as set forth in claim 10 wherein the establish the connection further comprises establish the connection to the host computing device over a USB connection.

12. The medium as set forth in claim 10 wherein the establish the connection further comprises establish the connection to the host computing device over a wireless connection.

13. The medium as set forth in claim 10 wherein the identify the one or more suspected key logging actions further comprises identify a write operation from the one or more identified hooking operations based on the one or more first set of rules.

14. The medium as set forth in claim 10 further comprises:
establish a secure connection to a management server; and
obtain over the established secure connection one or more updates to at least one of the one or more of the first set of rules or the one or more second set of rules.

15. The medium as set forth in claim 10 wherein the identify the one or more hooking operations performed in the one or more identified processes further comprises identify the one or more hooking operations to one or more function calls in the one or more identified processes.

16. The medium as set forth in claim 15 wherein the identify the one or more hooking operations to one or more function calls further comprises identify at least one of: SetWindowsHookEx, GetAsyncKeyState, GetKeyboardState, or GetKeyState.

17. The medium as set forth in claim 10 wherein the output further comprises output one or more recommended actions for at least one of the one or more identified suspected key logging actions or the one or more identified suspected aggressive key logging actions.

18. The medium as set forth in claim 17 wherein one of the one or more recommended actions comprises killing at least one of the one or more identified suspected key logging actions or the one or more identified suspected aggressive key logging actions.

19. A portable security device comprising:
one or more processors;
a memory coupled to the one or more processors which are configured to execute programmed instructions stored in the memory to and that comprise:
establish a secure connection to a management server;
obtain over the established secure connection one or more updates to a first set of rules;
establish another separate connection to a host computing device;
identify one or more processes running on the host computing device;
identify one or more hooking operations performed in the one or more identified processes;
identify one or more suspected key logging actions from the one or more identified hooking operations based on one or more of a first set of rules;
identify from the identified one or more suspected key logging actions one or more suspected aggressive key logging actions based on one or more of a second set of rules; and output the one or more identified suspected key logging actions and the one or more identified suspected aggressive key logging actions.

20. The device as set forth in claim 19 wherein the one or more processors is further configured to execute programmed instructions stored in the memory for the establish the connection further comprises establish the connection to the host computing device over a USB connection.

21. The device as set forth in claim 19 wherein the one or more processors is further configured to execute programmed instructions stored in the memory for the establish the connection further comprises establish the connection to the host computing device over a wireless connection.

22. The device as set forth in claim 19 wherein the one or more processors is further configured to execute programmed instructions stored in the memory for the identify the one or more suspected key logging actions further comprises identify a write operation from the one or more identified hooking operations based on the one or more first set of rules.

23. The device as set forth in claim 19 wherein the one or more processors is further configured to execute programmed instructions stored in the memory further comprises:
establish a secure connection to a management server; and
obtain over the established secure connection one or more updates to at least one of the one or more of the first set of rules or the one or more second set of rules.

24. The device as set forth in claim 19 wherein the one or more processors is further configured to execute programmed instructions stored in the memory for the identify the one or more hooking operations performed in the one or more identified processes further comprises identify the one or more hooking operations to one or more function calls in the one or more identified processes.

25. The device as set forth in claim 24 wherein the one or more processors is further configured to execute programmed instructions stored in the memory for the identify the one or more hooking operations to one or more function calls further comprises identify at least one of: SetWindowsHookEx, GetAsyncKeyState, GetKeyboardState, or GetKeyState.

26. The device as set forth in claim 19 wherein the one or more processors is further configured to execute programmed instructions stored in the memory for the output further comprises output one or more recommended actions for at least one of the one or more identified suspected key logging actions or the one or more identified suspected aggressive key logging actions.

27. The device as set forth in claim 26 wherein one of the one or more recommended actions further comprises killing the at least one of the one or more identified suspected key logging actions or the one or more identified suspected aggressive key logging actions.

\* \* \* \* \*